United States Patent [19]
Juncu et al.

[11] Patent Number: 5,633,776
[45] Date of Patent: May 27, 1997

[54] CIRCUIT BREAKER

[75] Inventors: Gheorghe J. Juncu, Fullerton; Steven V. Snead; Dan M. Culbertson, both of Anaheim, all of Calif.

[73] Assignee: Babcock, Inc., La Mirada, Calif.

[21] Appl. No.: 506,390

[22] Filed: Jul. 24, 1995

[51] Int. Cl.$^6$ ........................................ H02H 3/00
[52] U.S. Cl. ................ 361/115; 361/94; 361/170; 361/196; 335/32
[58] Field of Search ........................ 361/93–94, 98–99, 361/102, 115, 170, 195–196; 335/32

[56] References Cited

U.S. PATENT DOCUMENTS

| | | | |
|---|---|---|---|
| 4,333,122 | 6/1982 | Hayden et al. | 361/114 |
| 5,353,188 | 10/1994 | Hatakeyama | 361/97 |

*Primary Examiner*—Jeffrey A. Gaffin
*Assistant Examiner*—Michael J. Sherry
*Attorney, Agent, or Firm*—G. Donald Weber, Jr.

[57] ABSTRACT

An electronically controlled latching circuit breaker capable of being remotely set or tripped. The electronic controls are current sensitive rather than thermally activated.

28 Claims, 3 Drawing Sheets

CIRCUIT BREAKER

BACKGROUND

1. Field of the Invention

This invention relates to remotely activated circuit breakers, in general, and to remotely activated circuit breakers which are tripped by current sensing rather than thermal sensing, in particular.

2. Prior Art

There are many circuit breakers known in the art. Circuit breakers have many uses and, consequently, many designs. Typically, circuit breakers are used in lieu of fuses inasmuch as circuit breakers can be reset and are not permanently disabled.

One particular type of circuit breaker is a remotely activated circuit breaker. This type of circuit breaker finds application in many environments. For example, in a hostile environment, the circuit breaker may be located remotely from the activating, i.e. setting or resetting, switch.

In another application, a remotely operated circuit breaker is utilized in aeronautics systems. Thus, the circuit breaker can be located immediately adjacent to a power supply and the remote set and/or reset switch can be placed in a remote location. The remote location is, typically, the cockpit or flight deck of an aircraft, or the like. In this arrangement, the heavy duty wiring normally connected between the circuit breaker and the power source need not be utilized in the circuit from the power source (which can be in the fuselage of the aircraft, for example) to a switch in the cockpit of the aircraft. Rather, the circuit breaker is located adjacent to the power supply and a lightweight control signal wire can be connected to the remote switch in the cockpit area.

There are known remote circuit breakers of this type. However, most of these utilize thermal sensing devices to activitate the circuit breaker. In a conventional circuit breaker, a bi-metallic sensor device is heated by the current passing therethrough. The bi-metallic sensor device flexes and bends as a function of the temperature generated by the current therethrough. Ultimately, the bi-metallic sensor device trips a spring loaded mechanism to open the contacts of the circuit breaker in response to a current overload in the system. Obviously, the thermal sensor device is relatively slow acting, has a relatively wide tolerance range and the attendant questions of accuracy in operation. Moreover, the thermal sensing device exhibits a single (albeit not very precise) operating range.

SUMMARY OF THE INSTANT INVENTION

This invention comprises a circuit breaker which is capable of being remotely set or tripped thereby to provide an indication of the main contact position. The breaker electronically senses the current in a circuit and selectively trips the circuit breaker. A step-like operation can be achieved by using multiple comparators to electronically detect different current levels. Timing circuits establish an overload current versus time relationship wherein the circuit breaker will activate more rapidly (i.e. in a shorter period of time) in response to a higher overload than to a lower overload. This characteristic avoids spurious triggering for any and all overload conditions.

The circuit breaker includes an electric motor or solenoid which is selectively driven to open or close the contacts of the circuit breaker in accordance with the current conditions as determined by the control circuitry and the indicator/control unit (I/CU).

DESCRIPTION OF A PREFERRED EMBODIMENT

Figure 1:
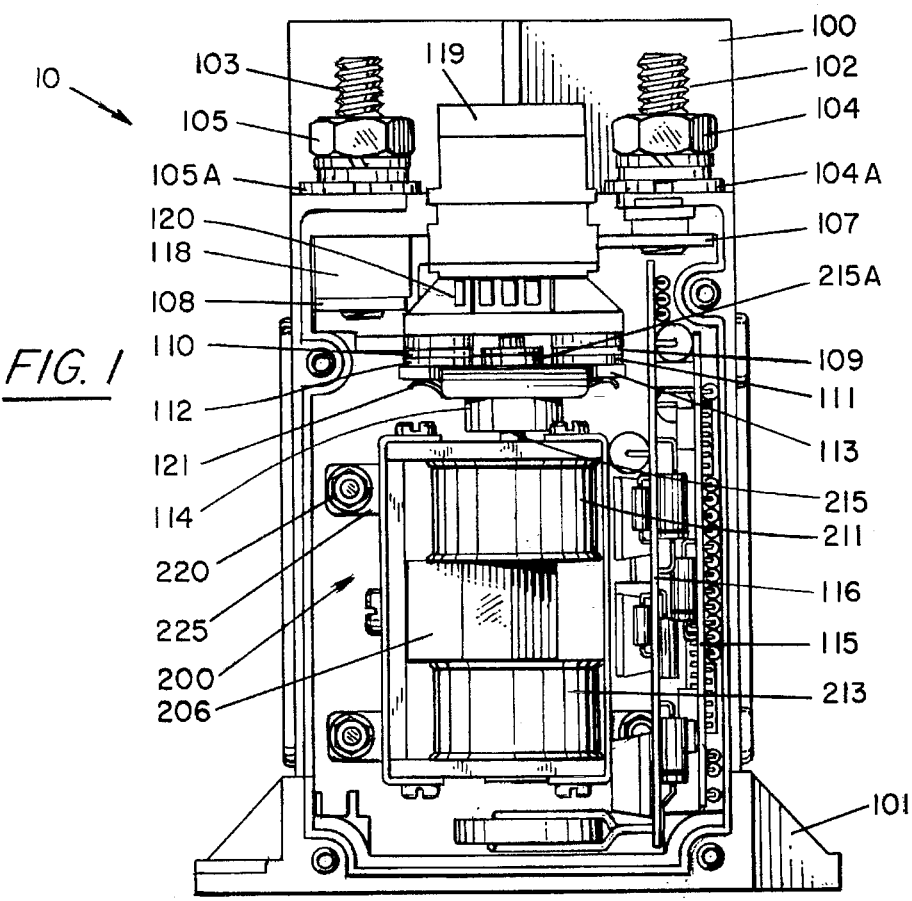
FIG. 1 is a front elevation view of one embodiment of the instant invention with the housing cover removed.

Referring now to FIG. 1, there is shown a front elevation view of one embodiment of the instant invention. In this embodiment, the circuit breaker 10 is mounted in a housing 100 which is formed, generally, of a non-conductive material. Typically, the housing 100 is fabricated of a suitable plastic material such as bakelite, dialylpthalate (DAP) or the like. The housing 100 is, generally, an electrically non-conductive material.

A base 101 is mounted to the housing 100. The base is, typically, formed of a metal or the like to provide appropriate strength and rigidity, as well as a system ground. The housing 100 is mounted to the base 101 by a suitable adhesive, force fit or the like.

A pair of terminals 102 and 103 are mounted in housing 100. In this embodiment, the terminals 102 and 103 are formed of threaded terminals such as bolts or the like. Nuts 104 and 105 are threadedly mounted on the contacts 102 and 103, respectively. The nuts 104 and 105 are used to retain the electrical conductor, for example a spade connector (not shown), from the power source which is being monitored by the system.

Terminals 102 and 103 are mounted to the housing 100 by means of threaded bushings 104A and 105A and inside terminals 107 and 108, respectively. In particular, the inner end of terminal 102 is joined to and/or threadedly connected to a copper contact support 107. The inner end of terminal 103 is mounted to contact support 108 in the same fashion. Moreover, a current sensor 118 is mounted to surround the terminal 103 adjacent to the contact support 108. The current sensor 118 is conventional and operates to sense the current which exists in terminal 103.

A metallic contact 109 is affixed to the copper contact support 107. Likewise, a metallic contact pad 110 is affixed to copper contact support 108. The ends of copper contact supports 107 and 108 bear against and are supported by the ledge 120 which is attached to the housing 100. Ledge 120, which is formed of insulating material, provides a support which maintains the contacts in the preferred position.

Metal contacts 111 and 112 are mounted on a common contact support 113 which is, typically, formed of an electrically conductive material such as copper or the like. The contacts 111 and 112 move with the contact support 113 as described hereinafter. An over travel spring 121 is mounted under the contact support 113 and provides an upward force. The spring 121 insures good contact pressure even as the contacts 111, 112, 109 and 110 errode during use.

The contact support pad 113 is mounted to the shaft 215 by a suitable fastening mechanism such as slip rings 215A or the like. An insulating support 114 is mounted on shaft 215 to provide support for contact support pad 113 and spring 121.

The shaft 215 is part of the plunger (see infra) of electric motor 200. The motor 200 (or solenoid) is described hereinafter but includes windings 211 and 213 which are mounted adjacent to the magnet 206 and the appropriate magnetic field return paths or keepers which are mounted in the motor housing 202 and 203. The motor 200 is mounted to the housing 100 by means of fastening means such as screws 220, which pass through the mounting ears 225.

In this embodiment, a pair of circuit boards 115 and 116 are mounted in the housing 100 adjacent to the magnetic assembly 200. The circuit boards support the circuitry (described infra) which operates the circuit breaker. The other components on the circuit boards are representative and are not enumerated in this Figure.

As will become apparent hereinafter, the circuit terminals 102 and 103 are connected in line with the power supply (not shown). When the contacts 109, 110, 111 and 112 are closed (i.e. in contact), current passes from terminal 102, through contact support 107, through contacts 109, 111, contact support pad 113, contacts 112 and 110, contact support 108 and terminal 103.

The current sensor 118 is arranged to sense the current passing through this circuit path. When the current is within appropriate limits, (as detected by the circuits on the circuit boards) the system remains operative and disposed as described above.

However, when the current in the system, as detected by sensor 118 and evaluated by the circuitry, becomes excessive, the electric motor 200 is rendered operative. The motor 200, after a certain period of time correlated with the load current, pulls the shaft 215 inwardly (downwardly in FIGS. 1 and 2) thereby breaking the connection between contacts 109 and 111 as well as contacts 110 and 112. Thus, the current path between terminals 102 and 103 is broken.

By operating the remote control unit, the circuit breaker 10 and, thus, the system can be interrogated to determine if the overload situation has ended wherein the motor plunger can be returned to the closed position. If the overload condition is not corrected, the circuit will automatically open again.

Figure 2:
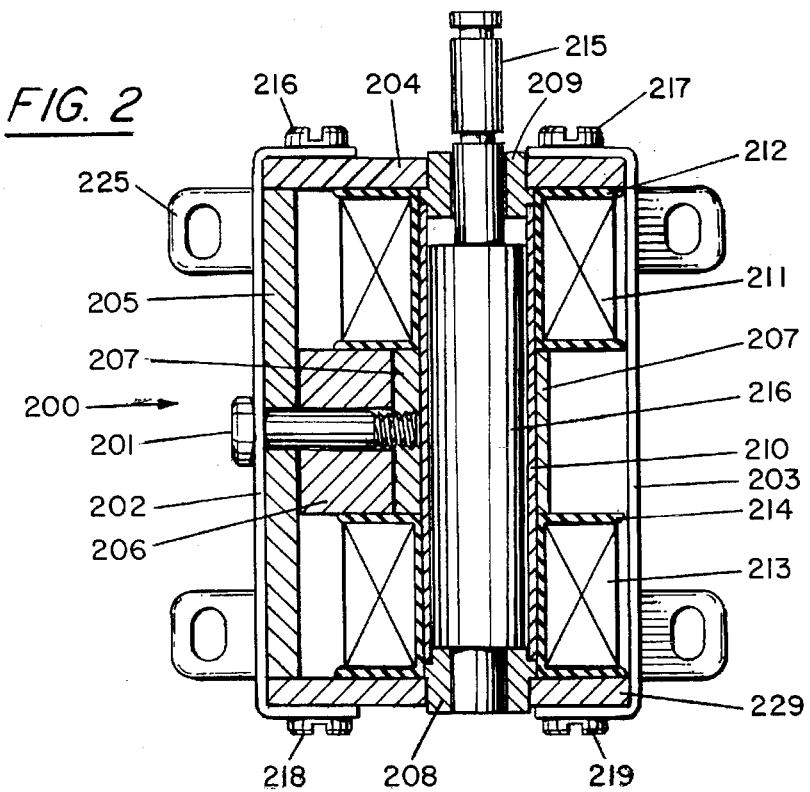
FIG. 2 is a cross-sectional view of the electric motor or solenoid of the circuit breaker.

Referring now to FIG. 2, there is shown a cross-sectional view of the electro-mechanical motor 200 noted in FIG. 1. In this case, the motor 200 includes the windings 211 and 213 which are conventional windings wound on conventional bobbins 212 and 214. The bobbins and/or windings are then placed on a sheath 210 for appropriate alignment. The magnet 206 and pole piece 207 are mounted on or around the sheath 210. The plunger or armature 216 is placed in the sheath 210. Appropriate bushings 208 and 209 are placed at opposite ends of the sheath 210 to support and retain the plunger 216 therein. The extended shaft 215 of the plunger 216 passes through the bushing 209 to be connected to the contact support pad 113, as shown in FIG. 1. The pole pieces 204, 205 and 229 are placed adjacent to the windings 211 and 213. An outer support shell which can take the form of frame halves 202 and 203 is placed on the magnets and pole pieces. A machine screw 201 is passed through the frame half 202, pole piece 205 and magnet 206 and is threadedly engaged with the pole piece 207. In addition, the shell 202 is affixed to the pole pieces 204 and 229 by machine screws 216 and 218. In like fashion, the frame half 203 is connected to the pole pieces 204 and 229 by machine screws 217 and 219. The frame halves 202 and 203 of the support shell include a plurality of ears 225 which are used to mount the motor apparatus 200 to the housing 100 as shown in FIG. 1.

As will be seen, the position (i.e. up or down) of the plunger 216 is set by applying an electric pulse to one of the windings 211 or 213.

Figure 3:
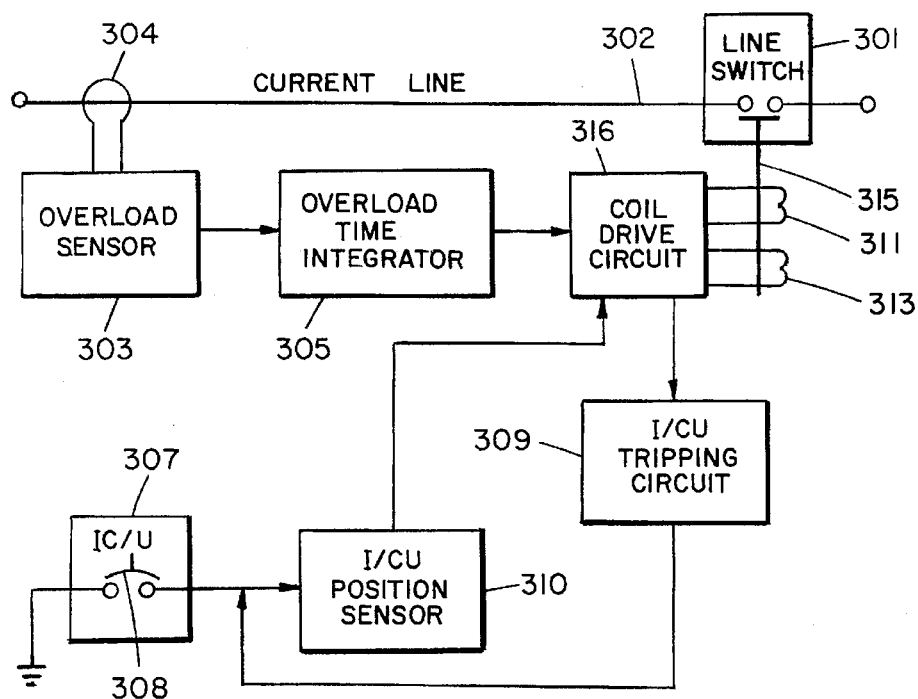
FIG. 3 is a functional block diagram of the circuit breaker system.

Referring now to FIG. 3, there is shown a schematic representation of the circuit of the instant invention. In this circuit, the current line 302 is connected to the line switch 301. The line switch 301 is equivalent to the contacts and terminals shown in FIG. 1. The armature shaft 315 of line switch 301 is equivalent to shaft 215 in FIG. 1. The windings 311 and 313 are equivalent to the windings 211 and 213 of FIG. 1. Thus, when the windings 311 or 313 either permit (or force) armature 315 into contact with the terminals in line switch 301, a complete circuit (or current path) is provided and current passes through line 302. The current in line 302 passes through the current detector 304 which is connected to the overload sensor 303. The current detector 304 is equivalent to the current sensor 118 in FIG. 1. The overload sensor 303 supplies an overload signal to the overload time integrator 305 which operates to determine the amount of overload as well as the amount of time that the overload condition has existed. Upon reaching a predetermined condition, the overload time integrator 305 provides a signal to the coil drive circuit 306 which selectively operates the coil 311 to retract the shaft 315 and, thus, the contact from the line switch 301. This operation has the effect of breaking the circuit and terminating the current passing through the current line.

The I/CU tripping circuit 309 is connected to receive a signal from the coil drive circuit 306 and to selectively trip the indicator/control unit 307 which is the remote indicator of the condition of the line switch 301. That is, when the circuit in switch 301 is broken, the I/CU 307 is operated and the button or stem 308 is exposed. The I/CU position sensor 310 is activated to determine whether or not the I/CU 307 is closed. The I/CU position sensor 310 provides a signal to the coil drive circuit 306 which will operate either coil 311 or coil 313, depending upon the position of I/CU 307, i.e. open or closed.

Conversely, the I/CU 307 can be manually operated to test the circuit breaker condition. Thus, if the overload condition no longer exists, the I/CU remains closed.

Figure 4:
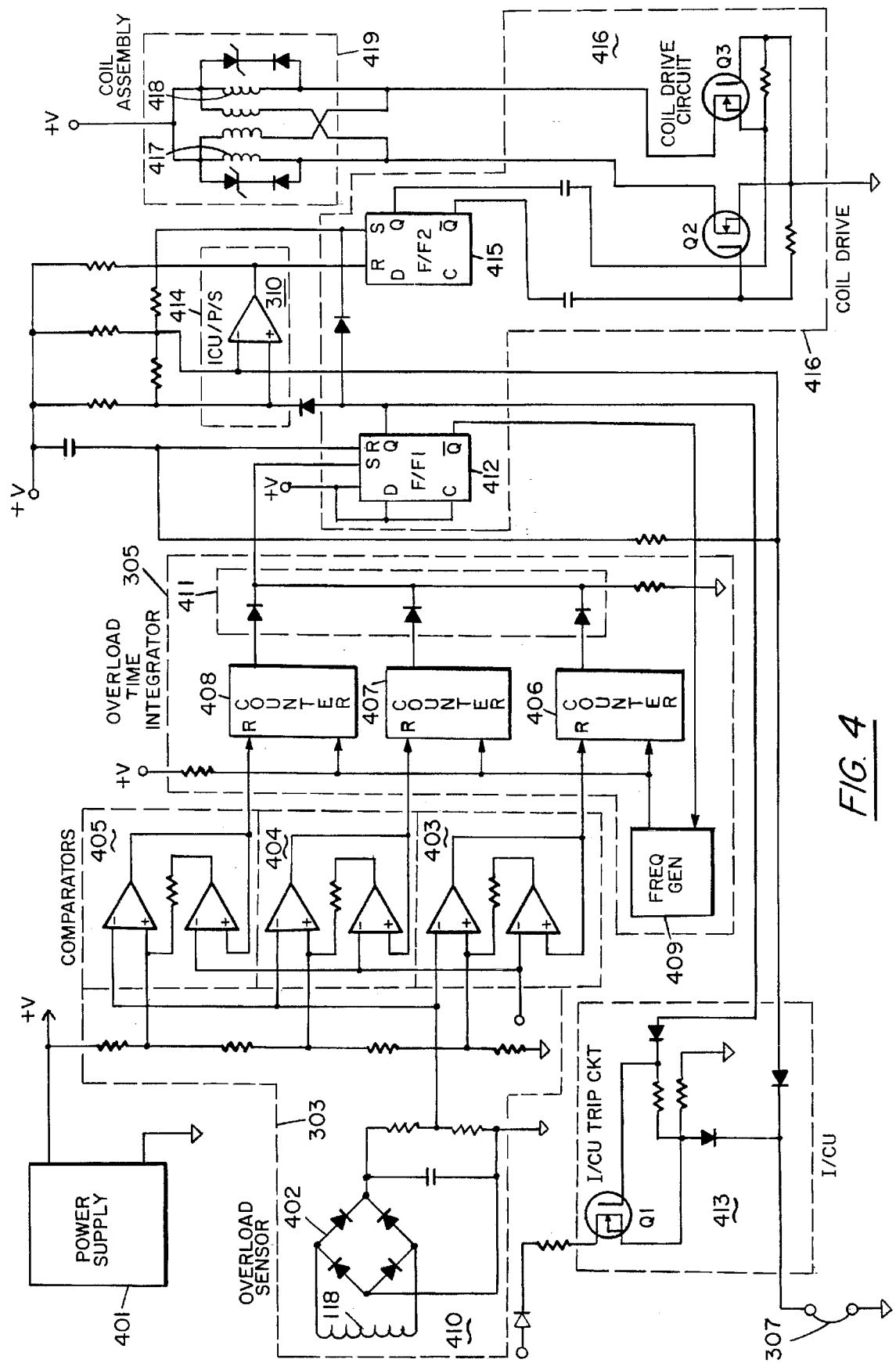
FIG. 4 is a schematic block diagram of the circuitry shown in FIG. 3.

Referring now FIG. 4, there is shown a schematic diagram of a preferred embodiment of the circuitry of the instant invention. In this circuit, some of the specific details of the circuit design are omitted for convenience. The power supply 401 is connected to the power source of the overall system such as the aircraft or the like. Of course, an alternative or standby source can be utilized. The power supply 401 operates to produce a regulated voltage signal +V.

In the specific embodiment shown in this invention, the current sensor transformer 118 (see FIG. 1) is connected to a rectifier bridge 402 which supplies a voltage signal to a plurality of a comparator circuits as described hereinafter. It should be understood that the combination of transformer 118 and rectifier bridge 402 is used in an AC system. It is also contemplated that Hall effect devices, transformer/saturable reactor combinations or the like can be used to effect this operation. Thus, the system will operate on an AC or DC signal equally as well. Only the sensor need be varied. Thus, the sensor 410 should be considered to represent a transformer, a Hall effect device, a transformer/saturable reactor combination or any other suitable sensor.

As noted the sensor 410 supplies a signal to the comparator circuits. In a preferred embodiment, a plurality of individual comparator circuits, i.e. comparators 403, 404 and 405 can be used in the comparator circuit to provide multiple levels of sensitivity in the system. However, the number of comparators, per se, is not critical to the invention and one or more comparators can be utilized. The comparators 403, 404 and 405 are all connected to receive the "overload" signal from the sensor 410 and to compare this voltage against a reference voltage. A number of reference voltages are provided by the power supply 401 in conjunction with a conventional voltage divider network or the like.

Typically, when the voltage supplied from the sensor 410 is below the particular reference voltage supplied to the overload comparators, the output signal produced by the respective comparator circuit remains low or a binary 0.

Conversely, whenever the voltage signal supplied by the sensor 410 exceeds the reference voltage on any one of the comparator circuits, that comparator is rendered operative and produces a high level or binary 1 output signal.

The output signal produced by each of the comparator circuits is supplied to a respective counter. Typically, the number of counters, e.g. counter circuits 406, 407 and 408, equals the number of comparator circuits. Thus, the operation of each counter is, effectively, controlled by the output of the comparator connected thereto.

Another input of each counter circuit is connected to receive signals from a frequency generator 409. These signals have a frequency of 138 Hertz, for example. This frequency generator is not intended to be limitative of the invention.

When the input signal supplied to a counter circuit by the appropriate comparator is low, the counter circuit is turned off and the frequency signals are not counted.

Conversely, when the individual counter is turned on by the appropriate signal from the associated comparator, the frequency signals are counted. It is, of course, possible that multiple comparator circuits and multiple counter circuits can be operating contemporaneously in an overload condition.

The outputs of all of the comparators are connected together by a diode OR-gate 411 and supplied to a flip-flop 412. Thus, when any one or more of the counter circuits 406, 407 or 408 achieves a preset number, these counter circuits provide a signal via the OR-gate 411 to the flip-flop 412 which is triggered thereby.

Flip-flop 412 is connected to the I/CU position sensor circuit 414, to the I/CU trip circuit 413 and to an input of flip-flop 415.

A positive output signal from flip-flop 412 turns on the FET Q1 which energizes the indicator/control unit (I/CU) 307. When the I/CU 307 is activated, the button, plunger, light or similar indicator is energized. Typically, a plunger is caused to be extended from the I/CU unit. The I/CU is located at the flight deck of an aircraft, for example. This indicates to the flight engineer, for example, that an overload condition cause the remote power controller to open.

When flip-flop 411 produces the positive signal, the I/CU position sensor 414 is also activated.

Simultaneously, the flip-flop 415 is activated and supplies a signal to the coil drive circuit 416. When the coil drive circuit 416 is activated, one of the FETs Q2 or Q3 is energized to energize the associated coil 417 or 418, respectively, in the coil assembly 419. These coils are equivalent to the windings 211 and 213 shown in FIG. 1. One of these windings is activated to move the armature 216 in the electric motor 200 shown in FIG. 2. Thus, when an overload condition is detected by the sensor, the comparator, the counter and the flip-flop, the armature is moved by the energization of winding 417, for example, and the line switch 301 shown in FIG. 3 is latched open.

Also, the flip-flop 415 can be activated by the I/CU position sensor 411. When the I/CU is open, a signal is supplied to the flip-flop 415, to activate the FET corresponding to the coil that will open the main contacts. When the I/CU is closed, the signal sent to the flip-flop 415 will activate the FET corresponding to the coil that will close the main contacts. Thus, the circuit breaker is a latching device.

As described above, when I/CU 307 is triggered, the indicator stem is moved outwardly to provide a visual indication that the circuit breaker has triggered. The observer can then manually operate the I/CU by pressing on the stem to determine if the overload condition has terminated or if a problem continues to exist. If the overload condition continues to exist, the I/CU will trip again. If the overload condition has terminated, the I/CU will remain closed and flip-flop 415 will be reset.

When flip-flop 415 is reset, the coil drive circuits including FETs Q2 and Q3 are activated in the opposite conditions. Thus, coil 417 is de-energized and coil 418 is energized whereby the solenoid 200 returns to the original position and the line contacts are closed.

Figure 5:
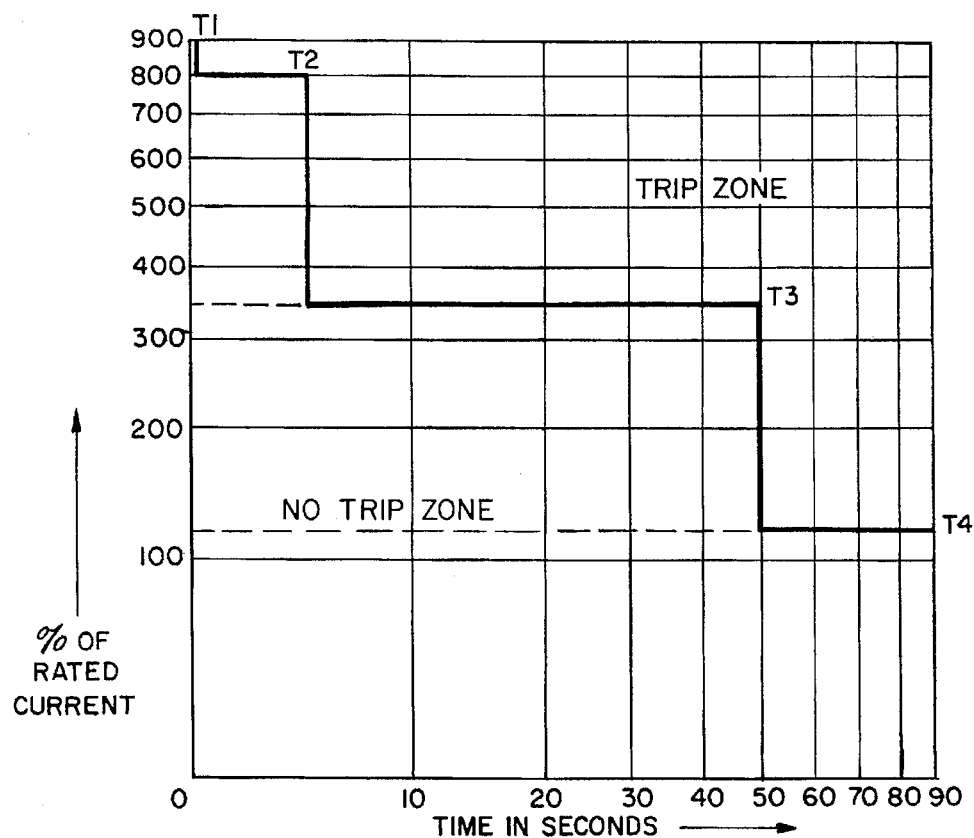
FIG. 5 is a graphic representation of the current/time operating characteristics of the circuit breaker.

Referring now to FIG. 5, there is shown graphical representation of the operation of one embodiment of this invention. In this embodiment, the system has at least three trigger points. This permits a certain amount of control and/or tolerance in the system. For example, the first trigger point T1 occurs when a current on the order of 800% (or more) of rated current, in amperes, is applied to the system. The system automatically and immediately trips because of the prescribed overload condition. Conversely, if the overload is below 800%, the circuit does not trip until trigger point T2 when the overload condition has existed for approximately five seconds.

In a similar vein, if the overload is below approximately 350% of rated current, the system does not trip until trigger point T3 which indicates that the overload condition has been existence for approximately fifty seconds.

If the overload is below 115% of rated current amperes, the system will not trip. Below this value all the counters will reset and the circuit breaker is ready for another overload condition.

Thus, tolerances are permissible for intermittent or low level overloads. High level or potentially catastrophic overloads are dealt with immediately. The overloads of lesser consequence are dealt with at a slower pace which suggests that an overload of some tolerable condition can exist for a tolerable time before the circuit is triggered.

Thus, there is shown and described a unique design and concept of remote power controller. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

We claim:

1. A circuit breaker comprising,
  current sensing means for producing a sensor signal representative of a current value in a current path,
  reference signal producing means for producing at least one reference signal, comparator means for comparing said reference signal with said sensor signal, said comparator means operative to produce an error signal when said sensor signal differs from said reference signal, frequency generator means for producing a frequency signal, counter means connected to said frequency generator means and to said comparator means, said counter means operative to receive and count said frequency signal when said comparator produces said error signal, said counter means operative to produce a counter signal when said counter means has counted a prescribed number of said frequency signals, latch circuit means connected to said counter means to receive said counter signal and produce a first latch signal in response thereto, logic circuit means connected between said counter means and said latch circuit means, and switch means connected to said latch circuit means to receive said first latch signal whereby said switch means is operated to interrupt said current path.

2. The circuit breaker recited in claim 1 wherein, said switch means includes,
contact means connected in the current path to selectively pass current therethrough, and
armature means connected to said contact means to selectively open said contact means.

3. The circuit breaker recited in claim 1 wherein, said current sensing means comprises a current transformer.

4. The circuit breaker recited in claim 1 wherein, said current sensing means comprises a Hall-effect device.

5. The circuit breaker recited in claim 1 wherein, said current sensing means comprises a transformer/saturable reactor combination.

6. The circuit breaker recited in claim 1 wherein, said reference signal means comprises a voltage divider network.

7. The circuit breaker recited in claim 1 wherein, said comparator means includes a plurality of comparator circuits each of which compares said sensor signal with reference signals of different magnitude.

8. The circuit breaker recited in claim 1 including, indicator means connected to said latch circuit means to receive a second latch signal whereby said indicator means is selectively activated.

9. The circuit breaker recited in claim 1 wherein, said switch means includes,
movable contact means connected to said current path, and
coil means connected to said latch circuit means to receive said first latch signal to selectively move said movable contact means to interrupt said current path.

10. The circuit breaker recited in claim 9 including, coil drive means connected between said latch circuit means and said coil means.

11. The circuit breaker recited in claim 8 wherein, said latch circuit means includes first and second bistable circuits for producing said first and second latch signals.

12. The circuit breaker recited in claim 1 wherein, said counter means includes a plurality of counting circuits, and said logic circuit means comprises an OR-gate.

13. The circuit breaker recited in claim 8 including, trip circuit means connected between said indicator means and said latch circuit means to activate said indicator means in response to said second latch signal.

14. The circuit breaker recited in claim 8 including, position sensor means connected to said indicator means to sense if the indicator means is activated.

15. The circuit breaker recited in claim 1 including, said latch circuit means includes first and second bistable circuits for producing said first and second latch signals, and
coil means connected to said latch circuit means to receive said first and second latch signals to selectively move said movable contact means to first and second latched positions respectively.

16. The circuit breaker recited in claim 1 including, said comparator means includes a plurality of comparator circuits each of which compares said sensor signal with a reference signal of different magnitude and produces a separate error signal representative of a difference between the sensor signal and the respective reference signal, and
said counter means includes a plurality of counting circuits, connected to a respective comparator circuit thereby producing counter signals representative of an error signal and a time duration thereof.

17. The circuit breaker recited in claim 8 wherein, said indicator means is located at a distance from the remainder of the circuit breaker.

18. A circuit breaker with multi-level switching capabilities comprising, current sensing means for producing a voltage signal representative of a current value in a current path, reference signal producing means for producing a plurality of reference signals, a plurality of comparator means, each of said comparator means connected for comparing one of said plurality of reference signals with said sensor signal, each of said comparator means operative to produce a separate error signal when said sensor signal differs from the respective one of said plurality of reference signals, frequency generator means for producing a frequency signal, a plurality of counter means connected to said frequency generator means and to a respective one of said comparator means, each of said counter means operative to receive and count said frequency signal only when said comparator produces said error signal, each of said counter means operative to produce a counter signal when said counter means has counted a prescribed number of said frequency signals representative of a prescribed time duration, latch circuit means connected to all of said counter means to receive all of said counter signals and produce a first latch signal in response to the counter signal which is first received, and switch means connected to said latch circuit means to receive said first latch signal whereby said switch means is operated to interrupt said current path.

19. A circuit breaker comprising, current sensing means for producing a sensor signal representative of a current value in a current path, comparator means for comparing said sensor signal with a reference signal and operative to produce a time integrated error signal representative of the amplitude differential between said sensor signal and said reference signal and the time duration of the differential, switch means connected to comparator means to receive said error signal whereby said switch means is selectively operated to interrupt said current path in response to said error signal, indicator means located at a distance from the remainder of the circuit breaker, trip circuit means connected between said indicator means and said switch means to activate said indicator means when said switch means is operated to interrupt said current path, and position sensor means connected to said indicator means to sense if the indicator means is activated.

20. The circuit breaker recited in claim 19 wherein, said switch means includes, movable contact means connected to said current path, coil means operative to selectively move said movable contact means to interrupt said current path, and coil drive means connected between said comparator means and said coil means.

21. The circuit breaker recited in claim 19 wherein, said comparator means includes a plurality of comparator circuits each of which compares said sensor signal with a plurality of reference signals of different magnitudes.

22. The circuit breaker recited in claim 21 including, voltage divider network for providing said plurality of reference signals.

23. A circuit breaker with multi-level switching capabilities comprising, current sensing means for producing a voltage signal representative of a current value in a current path, reference signal producing means for producing a plurality of reference signals, a plurality of comparator means, each of said comparator means connected for comparing one of said plurality of reference signals with said sensor signal, each of said comparator means operative to produce a separate error signal when said sensor signal differs from the respective one of said plurality of reference signals, frequency generator means for producing a frequency signal, a plurality of counter means each of which is connected to said frequency generator means and to a respective one of said comparator means, each of said counter means operative to receive and count said frequency signal only when said comparator produces said error signal, each of said counter means operative to produce a counter signal when said counter means has counted a prescribed number of said frequency signals representative of a prescribed time duration, latch circuit means connected to all of said counter means to receive all of said counter signals and produce a first latch signal in response to the counter signal which is first received, and switch means connected to said latch circuit means to receive said first latch signal whereby said switch means is operated to interrupt said current path.

24. The circuit breaker recited in claim 23 wherein, said latch circuit means includes first and second bistable circuits for producing said first and second latch signals.

25. The circuit breaker recited in claim 23 including, logic circuit means connected between said counter means and said latch circuit means.

26. The circuit breaker recited in claim 23 wherein, said logic circuit means comprises an OR-gate.

27. The circuit breaker recited in claim 24 including, movable contact means connected in said current path, and coil means connected to said latch circuit means to receive said first and second latch signals to selectively move said movable contact means to first and second latched positions respectively.

28. A circuit breaker comprising, current sensing means for producing a sensor signal representative of a current value in a current path, reference signal producing means for producing at least one reference signal, comparator means for comparing said reference signal with said sensor signal, said comparator means includes a plurality of comparator circuits each of which compares said sensor signal with reference signals of different magnitude, said comparator means operative to produce an error signal when said sensor signal differs from said reference signal, frequency generator means for producing a frequency signal, counter means connected to said frequency generator means and to said comparator means, said counter means operative to receive and count said frequency signal when said comparator produces said error signal, said counter means operative to produce a counter signal when said counter means has counted a prescribed number of said frequency signals, latch circuit means connected to said counter means to receive said counter signal and produce a first latch signal in response thereto, and switch means connected to said latch circuit means to receive said first latch signal whereby said switch means is operated to interrupt said current path.

* * * * *